US 6,912,693 B2
Jun. 28, 2005

(12) United States Patent
Camara et al.

(54) COMPUTER-IMPLEMENTED IMAGE ACQUISITION SYSTEM

(75) Inventors: Franc J. Camara, Redmond, WA (US); Richard S. Turner, Jr., Woodinville, WA (US); Mark R. Enstrom, Redmond, WA (US); Reed K. Bement, Kirkland, WA (US); Andrew S. Ivory, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 231 days.

(21) Appl. No.: 10/086,927

(22) Filed: Oct. 19, 2001

(65) Prior Publication Data

US 2002/0126158 A1 Sep. 12, 2002

Related U.S. Application Data

(62) Division of application No. 09/153,432, filed on Sep. 14, 1998, now Pat. No. 6,373,507.

(51) Int. Cl.⁷ .............................................. G06F 3/00
(52) U.S. Cl. .................. 715/771; 715/810; 715/835; 715/846; 715/970; 358/442; 358/474; 358/401; 382/312
(58) Field of Search ................................ 715/716, 764, 715/835, 846, 500.1; 716/771, 810, 970; 358/401, 403, 406, 442, 443, 474; 382/312; 345/716, 764, 810, 835, 846, 970, 840, 771; 348/231; 707/3

(56) References Cited

U.S. PATENT DOCUMENTS

| | | | |
|---|---|---|---|
| 4,837,635 A | 6/1989 | Santos | 358/401 |
| 5,191,645 A | 3/1993 | Carlucci et al. | 345/723 |
| 5,385,475 A | 1/1995 | Sudman et al. | 434/307 R |
| 5,412,773 A | 5/1995 | Carlucci et al. | 345/723 |
| 5,630,079 A * | 5/1997 | McLaughlin | 345/734 |
| 5,652,849 A * | 7/1997 | Conway et al. | 345/719 |
| 5,657,461 A * | 8/1997 | Harkins et al. | 345/733 |
| 5,706,457 A | 1/1998 | Dwyer et al. | 345/835 |
| 5,796,945 A | 8/1998 | Tarabella | 709/219 |
| 5,949,411 A | 9/1999 | Doerr et al. | 345/716 |
| 6,028,604 A | 2/2000 | Matthews, III et al. | 345/821 |
| 6,097,389 A | 8/2000 | Morris et al. | 345/804 |
| 6,118,546 A | 9/2000 | Sanchez et al. | 358/1.6 |

(Continued)

OTHER PUBLICATIONS

"Microsoft Media Manager Overview"—Informedia—Internet References. HTTP://www.asia.microsoft.com/mediamanager, Apr. 1997.

"Host System and Attached Non–Programmable Terminal with Open Parallel Port," IBM Technical Disclosure Bulletin, vol. 38 No. 09, Sep. 1995, pp. 475–478.

*Primary Examiner*—X. L. Bautista
(74) *Attorney, Agent, or Firm*—Lee & Hayes, PLLC (57) ABSTRACT

An image acquisition system has a computer and one or more imaging devices coupled thereto. Each imaging device has a device memory and is capable of capturing and storing a digital image in its memory. An image device manager is implemented in software on the computer to control imaging device operation. The image device manager presents a user interface (UI) within the familiar graphical windowing environment. The UI has a context space pertaining to a particular imaging context (e.g., scanning, photography, and video). The UI also has a persistently-visible imaging menu positioned within the context space that lists options particular to the imaging context. The image acquisition system also includes a set of application program interfaces (APIs) that enable applications to manage loading and unloading of imaging devices, monitor device events, query device information properties, create device objects, capture images using the devices, and store or manipulate the captured images.

9 Claims, 7 Drawing Sheets

U.S. PATENT DOCUMENTS

| | | |
|---|---|---|
| 6,239,882 B1 | 5/2001 | De Mangelaere et al. |
| 6,249,361 B1 | 6/2001 | Tahara |
| 6,288,716 B1 * | 9/2001 | Humpleman et al. ........ 345/733 |
| 6,425,001 B2 * | 7/2002 | Lo et al. ...................... 709/217 |
| 6,463,426 B1 * | 10/2002 | Lipson et al. ................... 707/3 |
| 6,486,976 B1 | 11/2002 | Nakamura et al. |
| 6,504,571 B1 * | 1/2003 | Narayanaswami et al. ...................... 348/231.99 |
| 6,587,129 B1 * | 7/2003 | Lavendel et al. ............ 345/776 |

* cited by examiner

Fig. 7

COMPUTER-IMPLEMENTED IMAGE ACQUISITION SYSTEM

RELATED APPLICATIONS

This is a divisional of U.S. patent application Ser. No. 09/153,432, filed Sep. 14, 1998, entitled "Computer-implemented image acquistion system" and listing Camera et al. as inventors, which is now U.S. Pat. No. 6,373,507.

TECHNICAL FIELD

This invention relates to computer-implemented systems for managing imaging devices, such as digital cameras, scanners, and the like. This invention also relates to graphical window user interfaces, and particularly to user interfaces used to facilitate capture and storage management of digital images. This invention further relates to operating systems and browsers that incorporate image device managers and user interfaces.

BACKGROUND

Digital imaging devices, such as scanners, cameras, video cameras, have been experiencing rapid growth in popularity as their price tags continue to decrease. Recreational photographers enjoy capturing pictures and videos and placing the digital files onto their computers for printing or emailing to friends and relatives. Businesses use scanners to digitally record documents used in day-to-day operation for archival purposes.

Other solutions to this problem already exist. For example, TWAIN and ISIS are two image acquisition systems that are available today. However, both of these solutions have problems. TWAIN lacks robustness and interoperability. ISIS is a proprietary design that renders it difficult to use with other applications.

Accordingly, a task set before the inventor was to create an image acquisition system that was based on an open architecture model and could be integrated with existing applications and operating systems to provide a convenient environment for the user.

SUMMARY

This invention concerns an image acquisition system that offers an open architecture to integration with existing operating systems and other applications.

In an exemplary implementation, the image acquisition system is implemented on computer, such as a desktop personal computer, having a processing unit, memory, and operating system. One or more imaging devices are coupled to the computer. Examples of the imaging devices include a scanner, a digital camera, a digital video camera, and so forth. Some imaging devices, such as digital cameras, have a device memory and are capable of capturing a digital image and storing the image on its memory. Other imaging devices, such as scanners, may not have their own device memory.

The image acquisition system further includes an image device manager that is implemented in software on the computer to control operation of the imaging devices. The image acquisition system presents a user interface (UI) within the familiar graphical windowing environment. The UI presents a graphical window having a context space that pertains to a particular imaging context (e.g., scanning, photography, and video). In the camera context, the context space presents image files stored on the camera memory and/or on the computer memory. In the scanner context, the context space includes a preview scan area that reveals a preview of the image in the scanner. In the video context, the context space presents video clips stored on the computer memory, but logically represented as belonging to the video camera.

The UI also has a persistently visible imaging menu positioned within the context space that lists options particular to an imaging context. For example, if the context space pertains to the camera context, the menu lists options to take a picture, store a captured image on the computer, send the image in an email, and so on. In the scanner context, the menu lists options to select an image type, preview an image, send the image to a particular destination, and scan the image.

The image acquisition system also includes a set of application program interfaces (APIs) that expose image management functionality to applications. The APIs enable applications to manage loading and unloading of imaging devices, monitor device events, query device information properties, create device objects, capture images using the devices, and store or manipulate the images after their capture.

BRIEF DESCRIPTION OF THE APPENDIX

An attached appendix forms part of this document. The appendix contains a description of methods implemented in an image acquisition API (application program interface) utilized by the image acquisition system.

DETAILED DESCRIPTION

This invention concerns a computer-implemented image acquisition system that manages imaging devices (such as digital cameras, scanners, digital video cameras, and the like) and the images captured by them. In a preferred implementation, the image acquisition system is implemented in a general-purpose computer (e.g., personal computer, laptop, etc.) to manage imaging devices attached locally to the computer or coupled remotely via a network. The image acquisition system supports a graphical user interface windowing environment that is integrates image device management with the same look and feel of familiar browsing user interfaces for conventional file systems. In this manner, a user encounters a familiar experience when managing the imaging devices and image files from his/her computer.

Exemplary System Architecture

Figure 1:
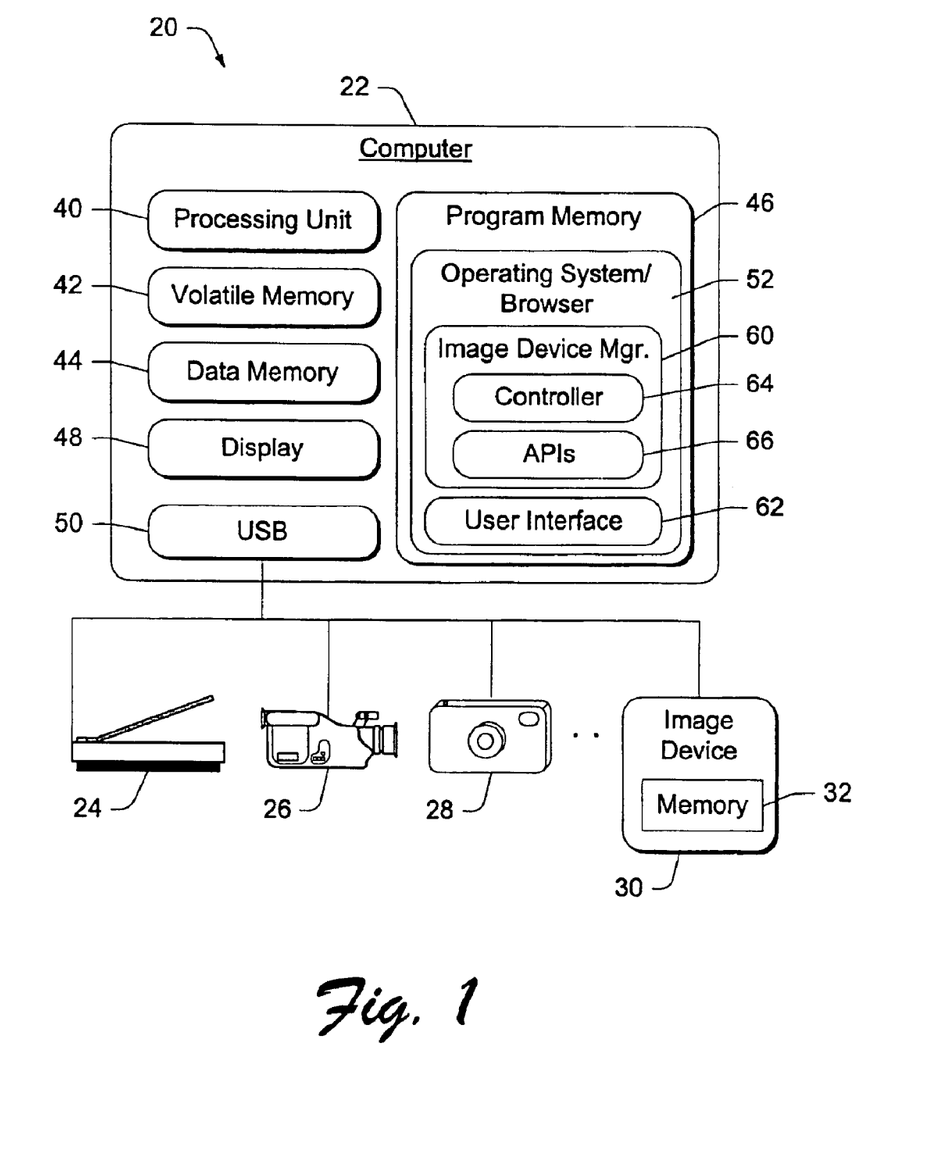
FIG. 1 is a block diagram of an image acquisition system.

FIG. 1 shows an image acquisition system 20 having a computer 22 coupled to multiple imaging devices 24–30.

The computer 22 is a general-purpose computing device that is described and illustrated, for discussion purposes, as a desktop personal computer (PC). The computer 22 has a processing unit 40, a volatile memory 42 (e.g., RAM), a non-volatile data memory 44 (e.g., disk drive, etc.), a non-volatile program memory 46 (e.g., ROM, disk drive, CD-ROM, etc.), a display 48 (e.g., VGA monitor), and a universal serial bus (USB) 50. An operating system/browser 52 is stored in program memory 46 and executed on the processing unit 40 when the computer is booted. Examples of suitable operating systems 52 include the Windows-brand operating systems from Microsoft Corporation and the operating systems from Apple Computer. Although a USB 50 is shown and described, other bus architectures may be used, including general serial buses, a SCSI bus, an IEEE 1394 serial bus that conforms to the IEEE 1394 specification, and so forth.

The imaging devices 24–30 are coupled to the computer via a serial connection to the USB 50. Illustrated examples of the imaging devices include a scanner 24, a video camera 26, and a digital camera 28. However, other imaging devices (e.g., copiers, facsimile machines, etc.) may also be used in conjunction with aspects of this invention, as represented by the generic imaging device 30. Some of the imaging devices have their own memory, as represented by memory 32 in imaging device 30. For example, the digital camera may have its own memory, whereas the scanner typically does not have a memory.

The image acquisition system 20 includes an image device manager 60, which is implemented as a software component loaded on the computer 22. More particularly, the image device manager 60 is stored in program memory 46 and runs on processing unit 40 during execution. The image device manager 60 may be integrated into the operating system 52 (as shown), executed as a set of services, or implemented as a separate self-contained program.

The image acquisition system 20 also has a user interface 62, which is preferably a graphical user interface that presents a graphical window having a context space pertaining to the imaging context. Depending upon the particular context, the context space may list available imaging devices for which device drivers have been loaded onto the computer, or list digital image files captured by one or more of the imaging devices, or show an image being scanned in by the scanner.

The user interface 62 further presents a persistently visible imaging menu positioned within the context space. The imaging menu lists options that are particular to controlling the various imaging devices. For instance, when the context space pertains to the camera context, the menu lists a "Take Picture" option that is specific to operating the digital camera 28. Upon user selection of "Take Picture", the image device manager 60 directs the digital camera 28 to record the current image obtained through the camera lens. In the scanner context, the menu lists a "Scan/Open" option that is particular to operating the scanner. Upon selection of this option, the image device manager 60 directs the scanner to scan the current image.

The image device manager 60 has an image device driver 64 and a set of APIs (application program interfaces) 66. The image device driver 64 controls operation of the imaging device in response to selected options in the context-specific menu. The driver 64 is the code that facilitates communication with the imaging device over the USB 50 and passes commands to capture an image, to read image files from the device's local memory, to obtain the device's properties, and so forth.

The APIs 66 define a set of interfaces that can be used to access the functionality of the image device manager 60. These APIs are described in detail in an Appendix to this disclosure, which is incorporated herein.

Exemplary Software Architecture

Figure 2:
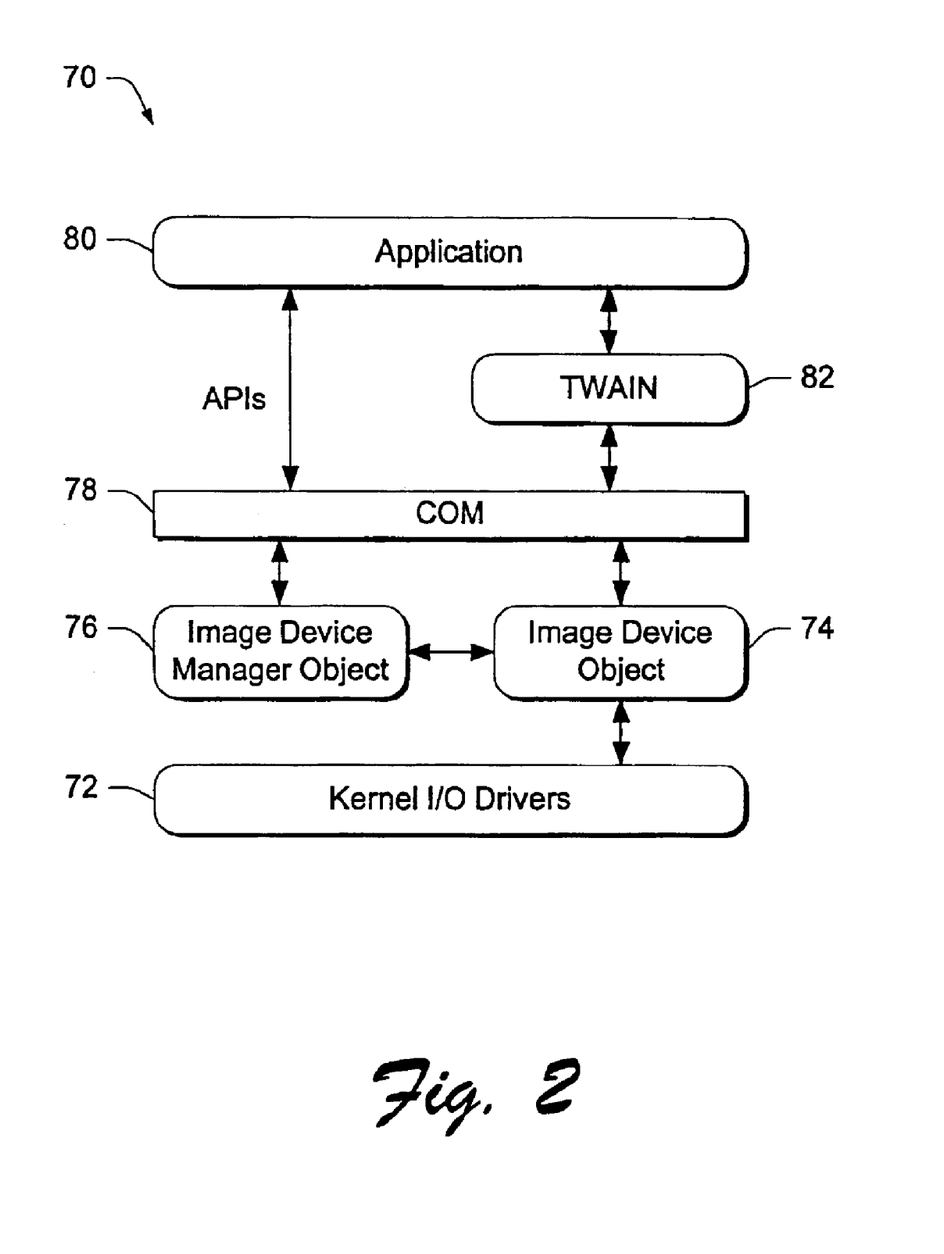
FIG. 2 is a block diagram of a software architecture for the image acquisition system.

FIG. 2 shows a software architecture 70 for implementing the image acquisition system. At the kernel level, the architecture 70 includes kernel I/O drivers 72 that include a bus driver to drive serial communication with the imaging device over the USB 50.

At the user level, a device driver 74 is loaded for the particular imaging device connected to the computer. The device driver 74 includes a device object, an optional UI, and optional image processing capabilities. An image device manager object 76 is called to initialize and select an image device, and create the device interface. The image device manager object 76 performs such tasks as instantiating a device driver object 74, determining the device status, monitoring events from the device, and so forth.

A COM (component object model) layer 78 exposes the device driver object 74 and image device manager object 76 to an upper level application 80. The application layer 80 represents both traditional TWAIN based applications that utilize a TWAIN compatibility layer 82, as well as new applications that support the APIs 66. Unlike the traditional TWAIN model, however, the TWAIN compatibility layer 82 interacts with the COM-based objects 74 and 76 rather than TWAIN-based devices.

Image Acquisition User Interface

The image acquisition system may be incorporated into the operating system, exist as a set of services, or be run as a separate, self-contained application. For discussion purposes, the image acquisition system is described as being integrated into an operating system that supports a graphical user interface windowing environment.

Figure 3:
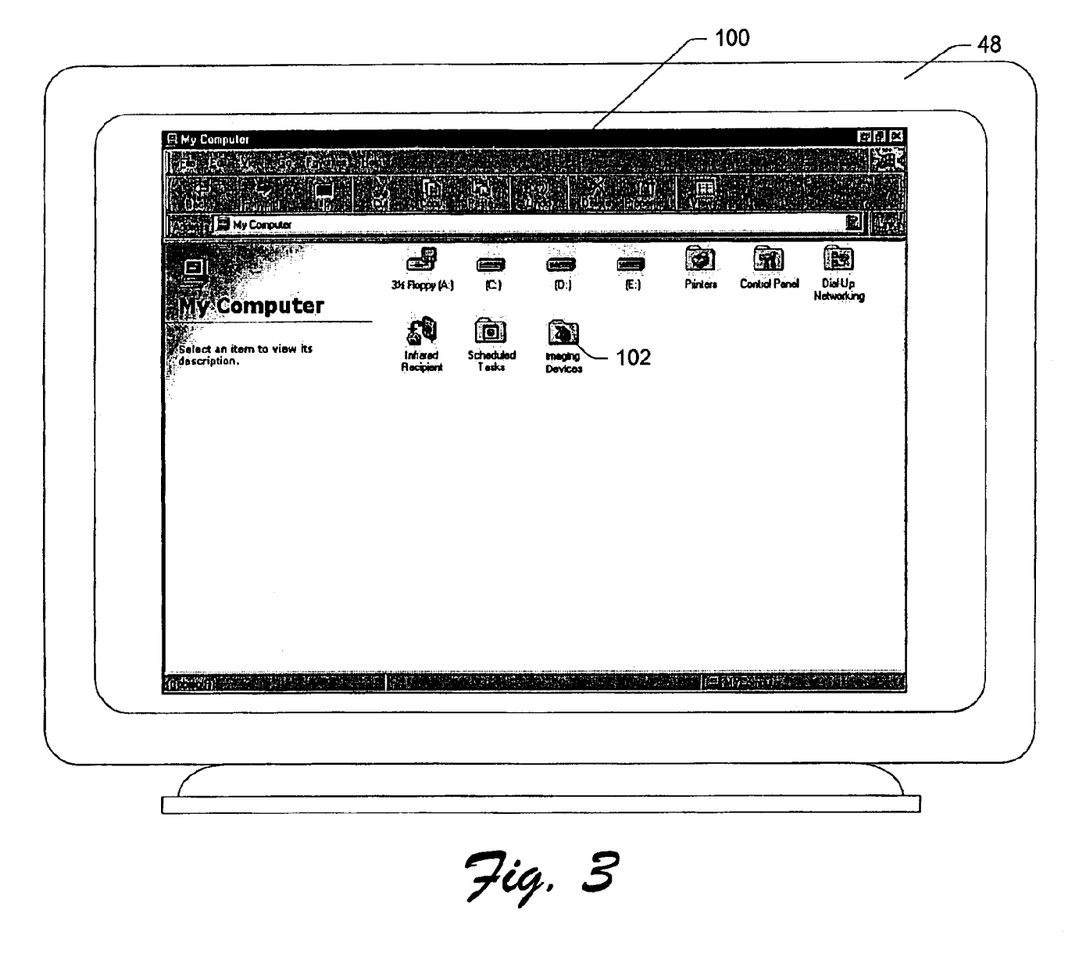
FIG. 3 is a diagrammatic illustration of a graphical user interface window showing integration of the image acquisition system within a familiar file system setting.

FIG. 3 shows an initial graphical user interface window 100 presented on the computer display 48. This window 100 is illustrated as the familiar "My Computer" screen within a browser-based windowing setting, which is well known to users of Windows®-brand operating systems. The "My Computer" window 100 presents a context for listing the major components that make up the user's PC, including disk drives, printers, a control panel, and networking functionality.

Of interest to the image acquisition system is the integration and treatment of the imaging devices as a folder 102 organized with the other general computer components. This provides a convenient starting point for the user to access the imaging devices 24–30 that are coupled to the computer 22.

When the user activates the "Imaging Devices" folder icon 102 for the first time, an installation Wizard comes up to guide the user through the installation of an imaging device. Suppose, for example, the user has installed two scanning devices and a digital camera. Activating the "Imaging Devices" icon 102 navigates to a new "Imaging Devices" window.

Figure 4:
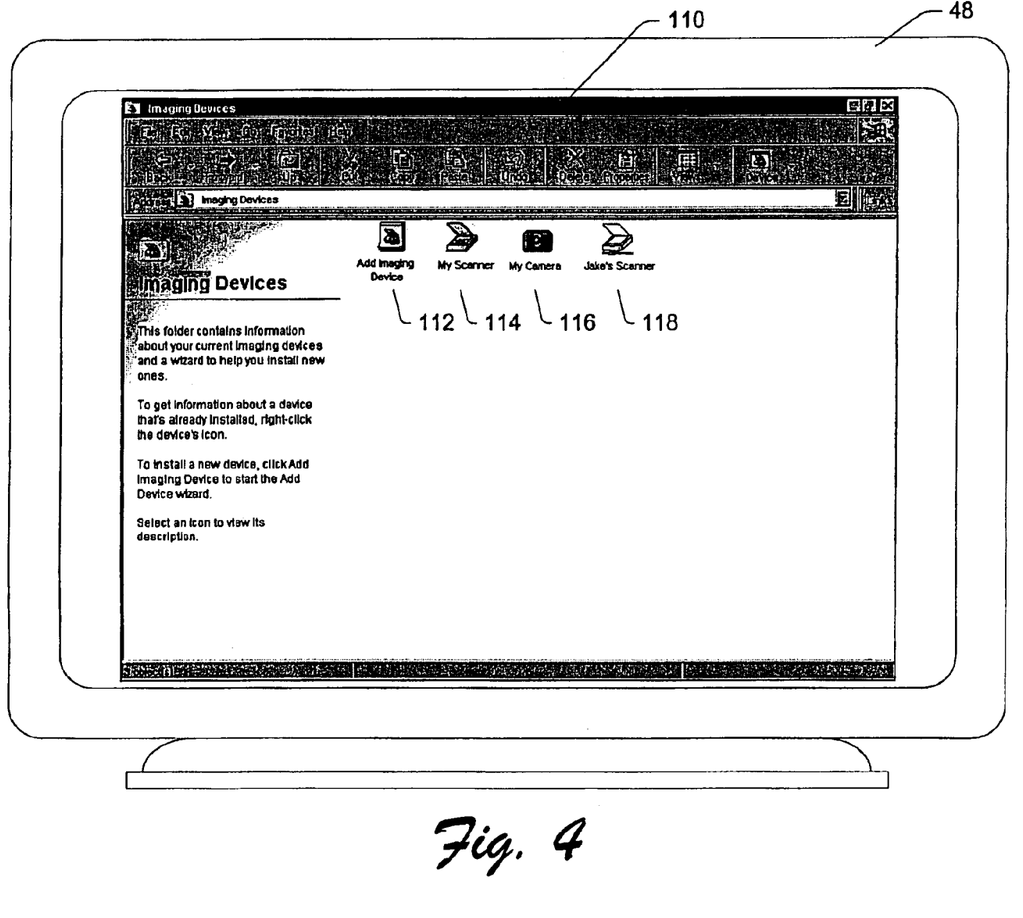
FIG. 4 is a diagrammatic illustration of a graphical user interface window showing an opening window for managing imaging devices.

FIG. 4 shows the "Imaging Devices" window 110 presented on the computer display 48. The "Imaging Devices" window 110 pertains to an imaging context and lists the imaging devices that have been installed on the computer. In this example, the window lists an "add imaging device" icon 112 and icons for the three installed devices: a "My Scanner" icon 114 for a locally installed scanner, a "My Camera" icon 116 for the installed camera, and a "Jake's Scanner" icon 118 for remotely installed (via a network connection) scanner. Activation of the "add imaging device" icon 112 recalls the installation Wizard to enable the user to install any additional imaging devices.

The "Imaging Devices" window 110 distinguishes between devices that are currently available and those that are not available (e.g., offline, physically removed, etc.). Devices that are not available are dimmed and the user has the option of uninstalling them. In FIG. 4, the second scanner identified as "Jake's Scanner" is not available and hence the icon 118 is dimmed.

Activating one of the imaging devices listed in window 110 causes the image acquisition system to present different windows exhibiting contexts that are specific to the selected imaging device. Within these device-oriented windows, the image acquisition system presents context-specific menus that contain items or options pertinent and relevant to the particular imaging device.

Figure 5:
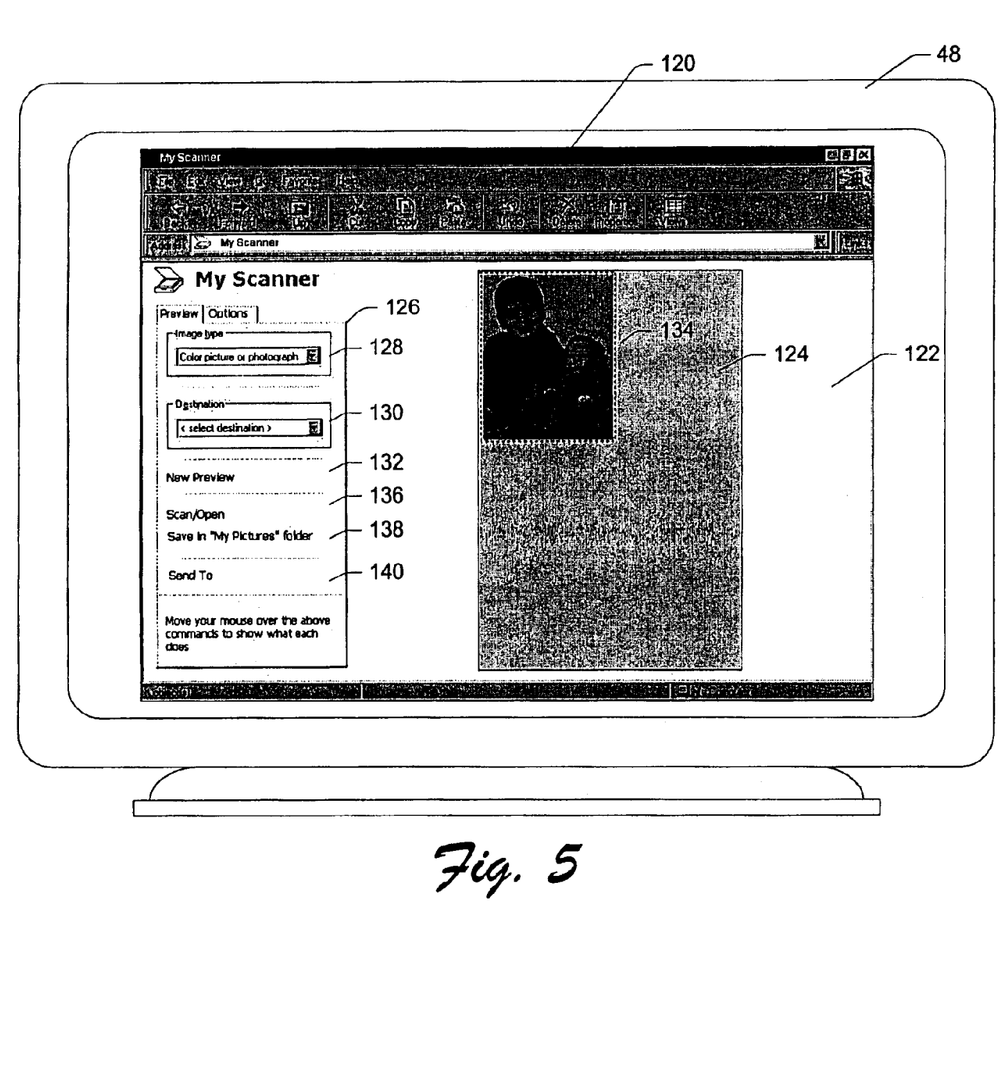
FIG. 5 is a diagrammatic illustration of a graphical user interface window for interfacing with a scanner.

FIG. 5 shows a "My Scanner" window 120 that is presented upon selection of the "My Scanner" icon 114 in FIG. 4. The scanner window 120 presents a context space 122 that pertains to the scanning context. The context space 122 has a preview scan space 124 and a persistently-visible, context-specific menu 126 positioned adjacent the preview scan space within the graphical window 120.

The context-specific menu 126 is always visible in the scanner window 120. The menu 126 offers options that are tailored to operating the scanner attached to the computer or remotely coupled to the computer via a network. While some of the options may be included in a context menu (i.e., a menu that appears near the pointer following a right mouse click), the persistently-visible menu 126 lists operating specific options tailored to the scanner that are not included elsewhere in the user interface.

The menu 126 includes an image type selection 128 that has a pull-down list of various image types from which a user may select. A non-exhaustive list of image types includes color photograph, black and white photograph, color line art, black and white line art, and text. The image types included in the pull-down list 128 are specific to the device. Some imaging devices may not provide support for a given format and hence the format is omitted in that particular list.

A destination selection 130 has a pull-down list of various choices on what to do with the scanned image. For instance, the list 130 might include using the image in an application, faxing the image, printing the image, copying the image to a clipboard, and saving the image in a file. The destination selection simplifies the output operation for the user. For example, selection of a choice directly affects the acquisition parameters and image quality without requiring the user to know what parameters to set.

The persistently-visible context-specific menu 126 also has a "New Preview" command 132 that directs scanners to create a preview image of an image that is currently in the scanning bed. The image is presented in the preview scan space 124. When the image appears in the scan space 124, a preview control 134 is provided to allow the user to select a region of the image for a final scan. In the illustrated implementation, the control 134 is shown as a dashed rectangular box framing the picture. The user can manipulate the box 134 to capture all or less than all of the image. Upon selection of the region, the control can proportionally resize the image to reflect the size of the scanner bed and automatically configure the scanner to make the appropriate adjustments to capture the selected image portion.

The menu 126 includes a "Scan/Open" command 136 to direct the scanner to capture the image. When this command is selected, the scanner scans the image in its bed. Concurrently with this scanning action, the image progressively appears in the preview scan space 124 to visually convey that the scanner is scanning the image. In one implementation, the image is progressively displayed row-by-row from top to bottom of the image.

The menu 126 includes a "Save" option 138, which directs the scanner to capture the image as a file and store the file in the computer memory. The last listed option is a "Send to" option 140, which allows the user to send the image to various locations (or applications) on the PC, such as for packaging in a facsimile or email.

Figure 6:
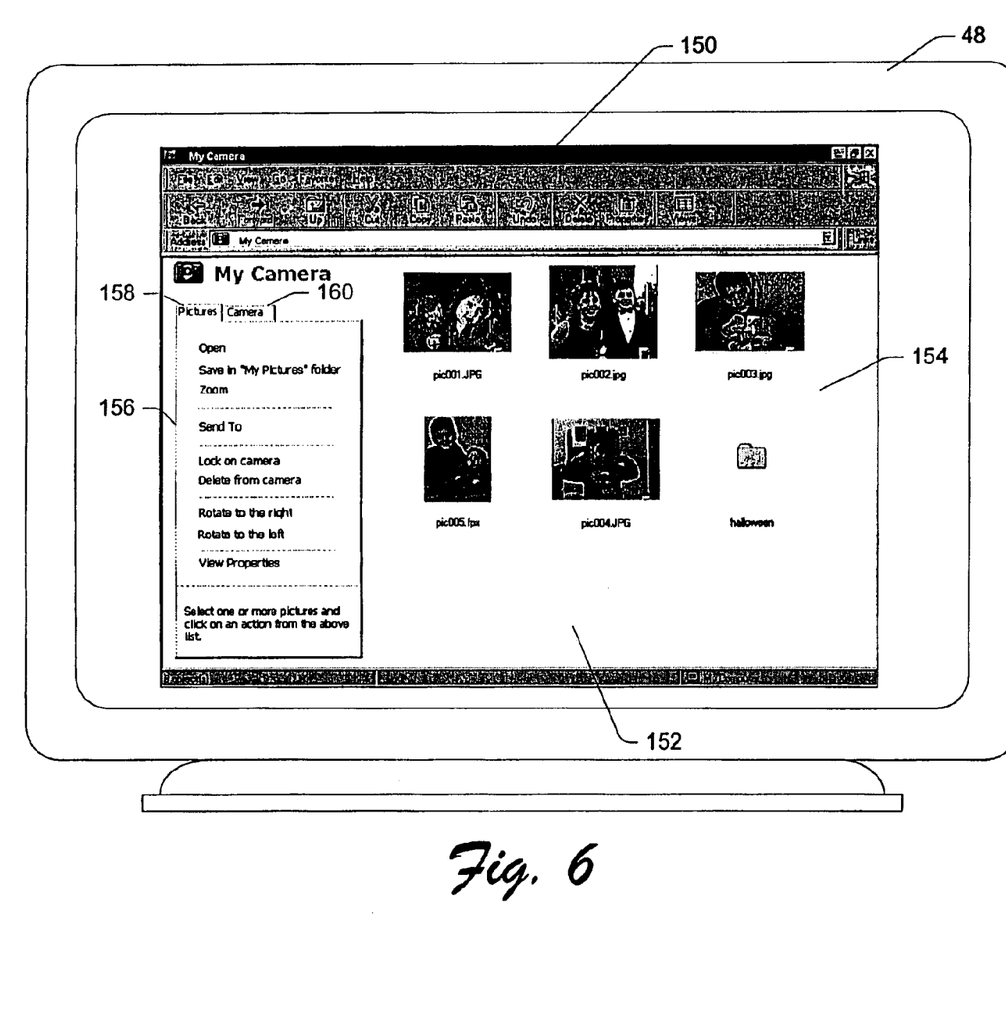
FIG. 6 is a diagrammatic illustration of a graphical user interface window for interfacing with a digital camera.

FIG. 6 shows a "My Camera" window 150 that is presented upon selection of the "My Camera" icon 116 in FIG. 4. The camera window 150 presents a context space 152 that pertains to the camera context. The context space 152 has a file space 154 and a persistently-visible, context-specific menu 156 positioned adjacent the file space within the graphical window 150.

The context-specific menu 156 is always visible in the camera window 150 and offers options that are tailored to operating the digital camera 28 attached to the computer. While some of the options may be included in a context menu (i.e., a menu that appears near the pointer following a right mouse click), the persistently-visible menu 156 lists operating specific options tailored to the camera that are not included elsewhere in the user interface.

The menu 156 is illustrated as having two tabs: a pictures tab 158 and a camera tab 160. Table 1 contains the options and corresponding functions available on the pictures tab 158.

TABLE 1

| Option | Function |
| --- | --- |
| Open | Opens a picture with a default registered application. |
| Save in "My Pictures" folder | Downloads the images from the camera and copies them to "My Pictures" directory on computer memory. |
| Zoom | Changes the window view and allows the user to select one picture at a time and zoom in/out of the picture once it is copied locally. |
| Send to | Allows the user to send the picture to various locations (or applications) on the PC. For example, the user may choose to "send" the picture to an "email recipient". |
| Lock on Camera | Allows the user to lock a picture to prevent accidental deletion. |
| Delete from Camera | Allows the user to permanently remove the picture from the camera after a confirmation. |
| Rotate to the Right | Allows the user to rotate the picture 90 degrees to the right. |
| Rotate to the Left | Allows the user to rotate the picture 90 degrees to the left. |
| View Properties | Allows the user to view properties associated with the selected picture(s). |

Table 2 contains the options and corresponding functions available on the camera tab 160.

TABLE 2

| Option | Function |
| --- | --- |
| Take Picture | Triggers the camera to take a picture. |
| Copy all Pictures | Copies all the pictures to designated location on the PC. |
| Remove all Pictures | Deletes all pictures in the camera. |

TABLE 2-continued

| Option | Function |
| --- | --- |
| Share | Brings up a wizard for the local user to share the camera. |
| Initialize Memory Card | Enables user to initialize the storage card in the camera. |
| View Properties | Allows the user to view a summary of the camera properties. |

The file space 154 lists files and/or folders that pertain to digital images taken by the digital camera. The files are the images themselves (e.g., JPG files) and the folders contain image files and/or other folders with image files in them.

The file space 154 presents the files that are currently stored on the camera. In this manner, the user can easily view the camera memory as if it were another memory of the computer. The UI allows easy integration of the camera control into the familiar windowing environment.

To add a picture to the file space, the user captures a picture using the "Take Picture" command in the camera menu 160. The picture then appears as a file in the file space 154. The user can then select the image file by clicking on the file and manipulating the picture using the commands on the pictures menu 158, such as "Rotate to the Left", "Rotate to the Right", "Zoom", and "Send to". The user can also save the image file to the computer memory using the command "Save in My Pictures folder".

Figure 7:
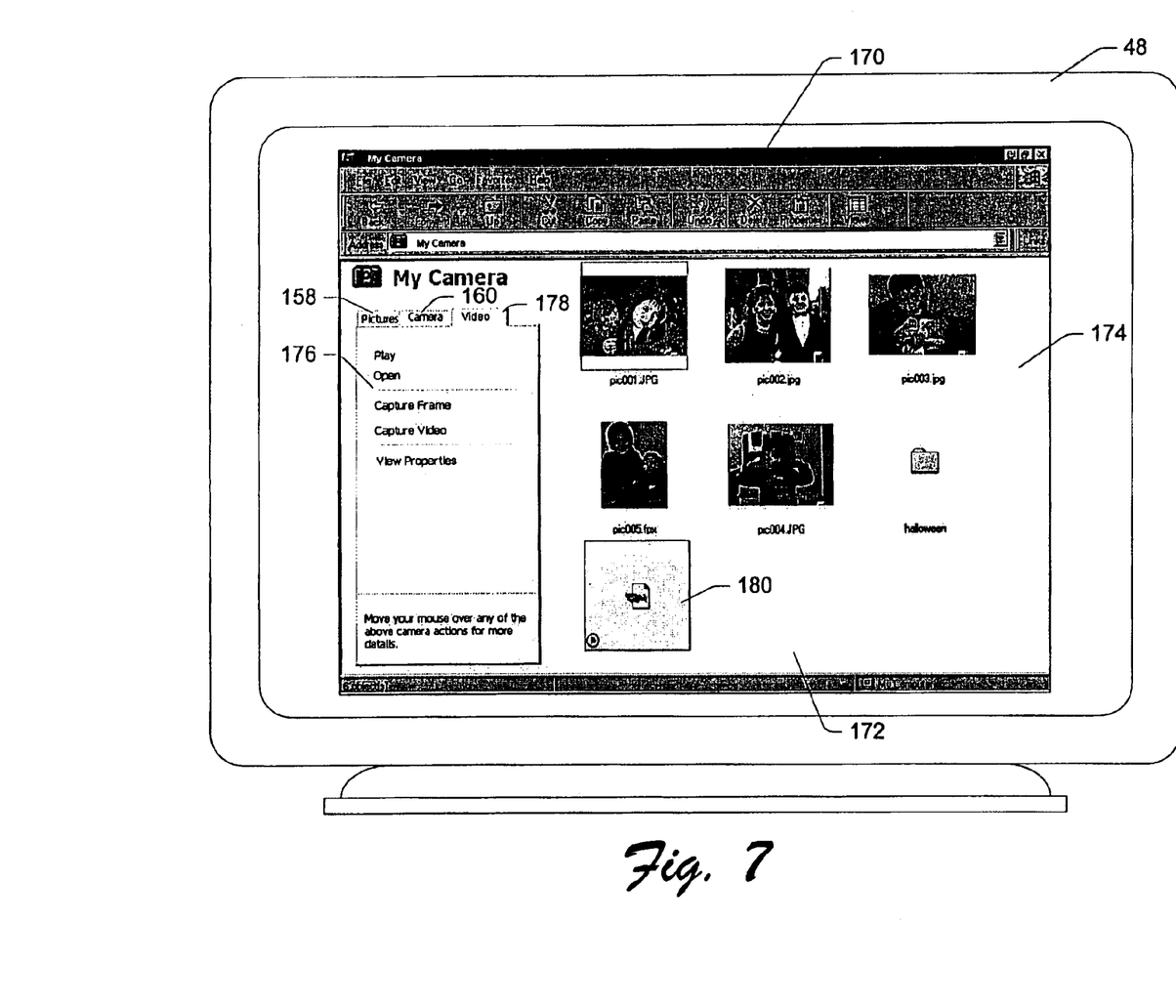
FIG. 7 is a diagrammatic illustration of a graphical user interface window for interfacing with a digital video camera.

FIG. 7 shows a modified "My Camera" window 170 that supports dual-mode cameras (i.e., video and still). The modified window 170 is presented upon selection of the "My Camera" icon 116 in FIG. 4 and is similar to the window 150 of FIG. 6 in that it has a context space 172 with a file space 174 and a persistently-visible, context-specific menu 176. However, in this modified implementation, the context-specific menu 176 also has a video tab 178 to list options pertaining to operation of the video camera 26.

Notice also that one of the files in the file space 174 is a play-in-place video file 180. This play-in-place video file 180 can be actuated to play a video clip or stream within the small area depicted as box 180. That is, the static video icon in box 180 is replaced with a streaming video at the same location in the file space. Play-in-place video files 180 were first introduced in Media Manager, a multimedia application available from Microsoft.

Table 3 contains the options and corresponding functions available on the video tab 178.

TABLE 3

| Option | Function |
| --- | --- |
| Play | Plays back a video stream from the video camera. |
| Open | Opens a video file with a default application. |
| Capture Frame | Directs the video camera to record a single still-image frame. |
| Capture Video | Directs the video camera to record a video clip. |
| View Properties | Allows the user to view a summary of the video camera properties. |

Other commands may be added to the menu. For instance, a "stop" command may be employed to halt the capture of live video.

Image Acquisition API

The image acquisition API 66 enables applications to manage loading and unloading of all imaging devices, monitor device events, query device information properties, create device objects, capture images using the devices, and store or manipulate the images after their capture.

The interfaces are accessible by high level languages (e.g., Visual Basic) as well as lower level ones (e.g., C, C++, etc.). COM is a suitable interface. In this context, each device is exposed as a COM object, whereby the object provides a number of methods and properties associated with the imaging device.

As one exemplary implementation, there are three general objects: a device manager object, a camera object, and a scanner object. The objects are described generally below. A more detailed description of the objects and methods are provided in the Appendix to this disclosure. This Appendix is incorporated into the disclosure.

The device object contains device context and status information for a physical device. Once a device object is created for a physical device, the physical device controls what device properties are available and what values the properties may assume. There may be multiple device objects created for any physical device. However, a device object has exclusive access to a physical device before any operation (i.e., scan, take a picture, etc.) is performed. Exclusive access to a physical device is made available through a locking/unlocking mechanism.

The device manager is implemented as three objects that perform the following functions:

A CImageInDevMgr object is used to:
Create a device enumerator object
Create a device object when given a DeviceID
Display UI to let a user choose a device object
Display UI to both choose a device and acquire an image from the chosen device.

A CEnumImageInDevInfo object is used to:
Enumerate all ImageIn devices on a system. For each device enumerated, a CImageInDevInfo object is returned.

A CImageInDevInfo object is used to:
Query device information properties from the ImageIn device. One of the properties, Device ID, can be used by CImageInDevMgr to create a device object.

The camera object may expose the following functions:
Open and close the device for communication
Control the device
Update and read device properties
Update and read picture properties
Download, remove, and upload pictures to device The scanner object may expose the following functions:
Open and close the device for communication
Control the device
Update and read device properties
Set operation intent Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An application program interface for an image acquisition system and having user controls for initiating the following functions:

creating a device object for an imaging device;

displaying a first user interface portion to enable a user to choose the device object;

displaying a second user interface portion to enable the user to capture an image using the imaging device; and querying the imaging device for properties, wherein the first and second user interface portions each include:
  a graphics window including a user interface area having a menu and toolbar area and a context space separate from the menu and tool bar area; and the second user interface portion includes:
  a preview scan space within the context space, the preview scan space being initially empty; and
  a persistently-visible menu adjacent the preview scan space and within the context space, wherein the preview scan space is configured to progressively display an image within the preview scan space to visually convey that the imaging device is scanning the image.

2. The application program interface of claim 1, wherein the application program interface is embodied on a computer-readable medium.

3. The application program interface of claim 1, wherein the preview scan space configured to progressively display an image is configured to build the image row-by-row.

4. The application program interface of claim 1, wherein the preview scan space configured to progressively display an image is configured to build the image simultaneously as the imaging device scans the image.

5. The application program interface of claim 1, wherein the persistently-visible menu lists options in the menu that are particular to operating the imaging device, and wherein the application program interface includes user control portions configured to facilitate user selection among imaging devices chosen from a group consisting of: a video camera, a digital camera, a scanner and a digital memory configured to store digital image data.

6. A computer-readable medium having embodied thereon computer-readable code that is configured to cause one or more processors to cooperate in acts including generation of a graphical user interface associated with an image acquisition system and enabling user controls for initiating the following functions:
  creating a device object for an imaging device;
  displaying a first user interface portion to enable a user to choose the device object;
  displaying a second user interface portion to enable the user to capture an image using the imaging device; and
  querying the imaging device for properties, wherein the first and second user interface portions each include:
    a graphics window including a user interface area having a menu and toolbar area and a context space separate from the menu and tool bar area; and wherein the second user interface portion includes:
    a preview scan space within the context space, the preview scan space being initially empty; and
    a persistently-visible menu adjacent the preview scan space and within the context space, wherein the preview scan space is configured to progressively display an image within the preview scan space to visually convey that the imaging device is scanning the image; and wherein, after querying, the graphics window includes:
    a list of menu options particular to operating the imaging device.

7. The computer-readable medium of claim 6, wherein the preview scan space configured to progressively display an image is configured to build the image row-by-row.

8. The computer-readable medium of claim 6, wherein the preview scan space configured to progressively display an image is configured to build the image simultaneously as the imaging device scans the image.

9. The computer-readable medium of claim 6, wherein the application program interface includes user control portions configured to facilitate user selection among imaging devices chosen from a group consisting of: a video camera, a digital camera, a scanner and a digital memory configured to store digital image data.

* * * * *